Sept. 30, 1969   B. A. PETERSON ET AL   3,469,360
DOOR FRAMES
Filed Aug. 4, 1967   5 Sheets-Sheet 4
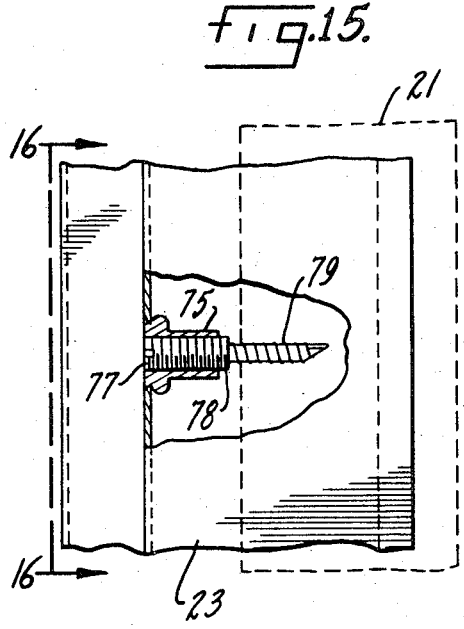
fig.15.
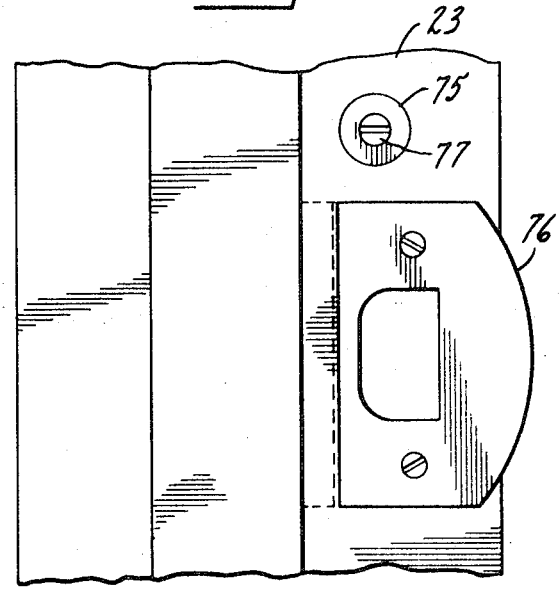
fig.16.
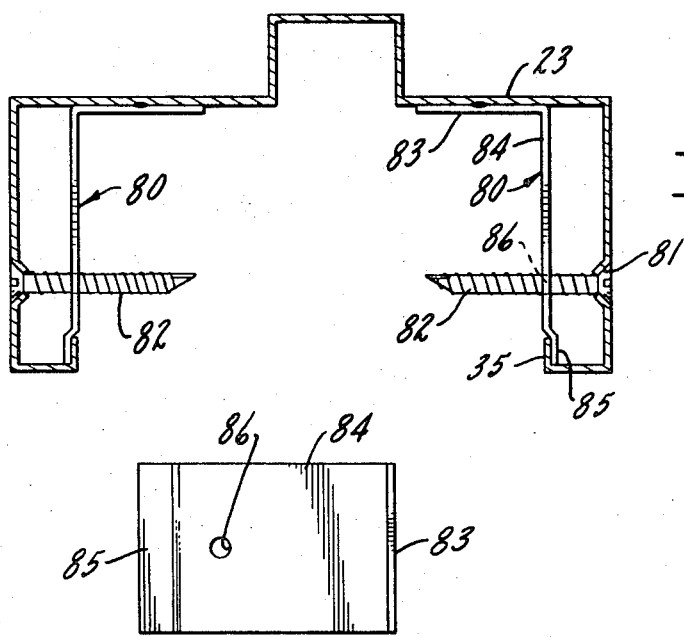
fig.17.
fig.18.
INVENTORS.
GALE K. CARLSON
BULOW A. PETERSON
BY Mann, Brown & McWilliams
Attorneys.

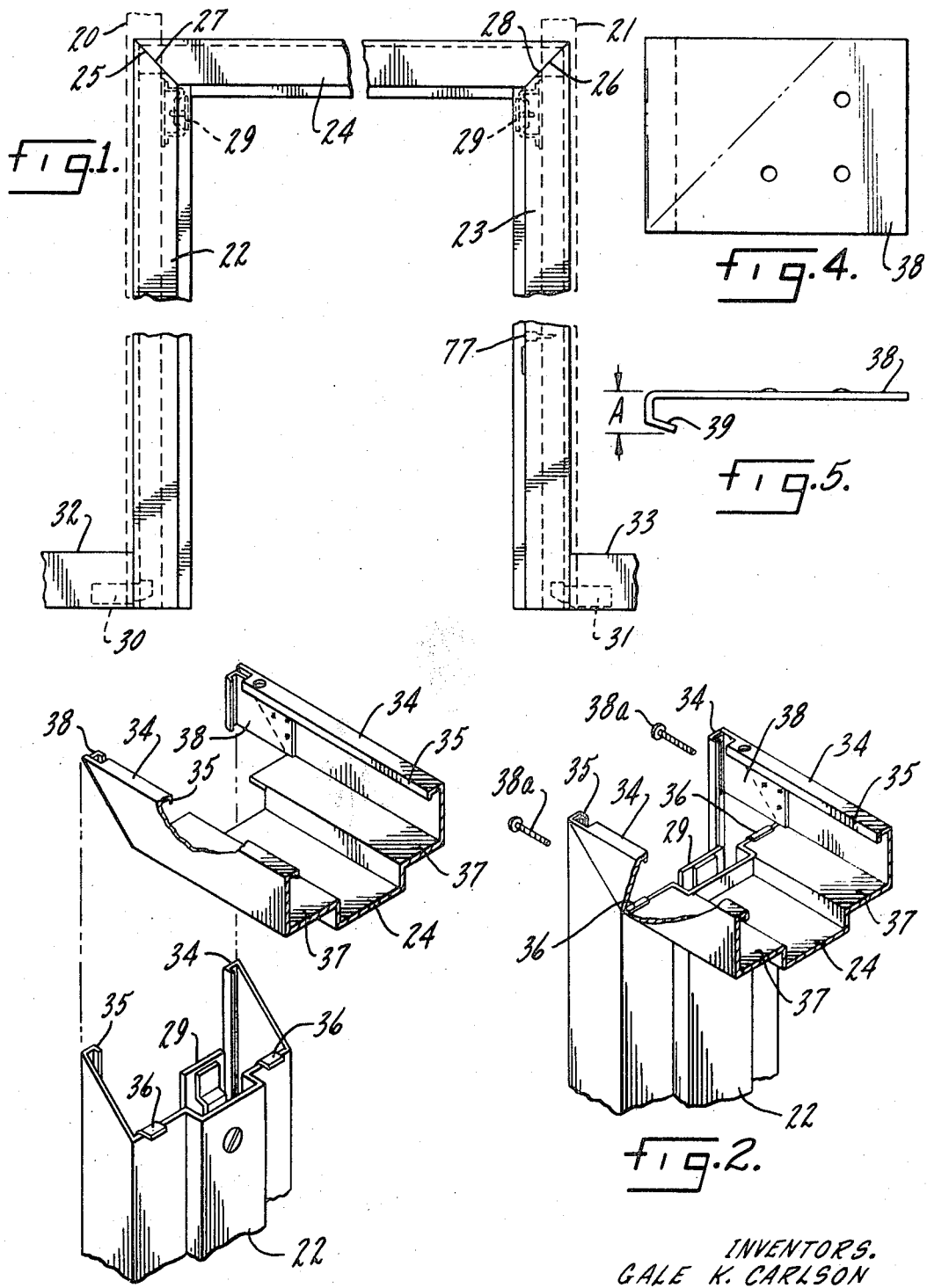

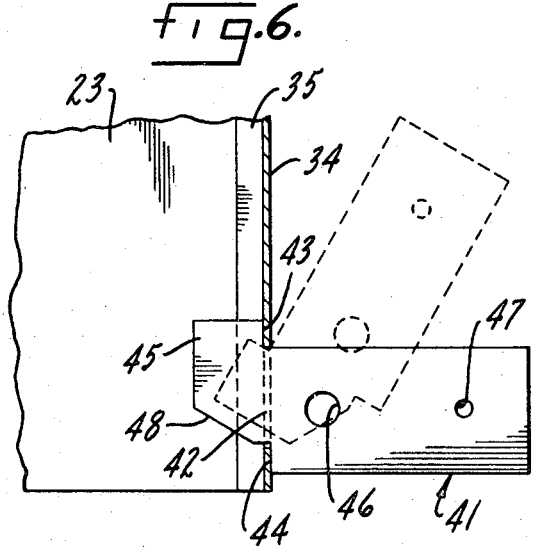
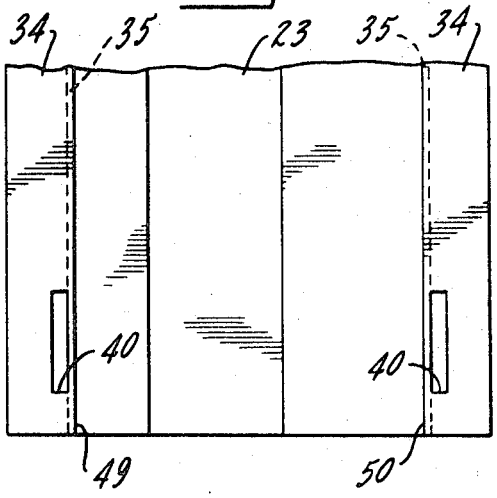
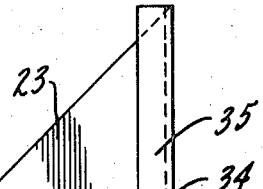
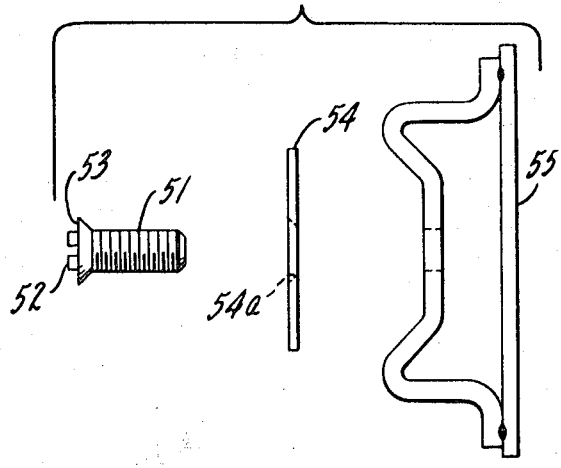

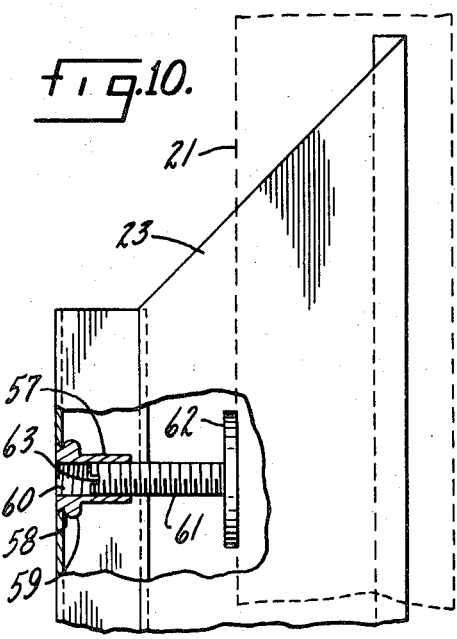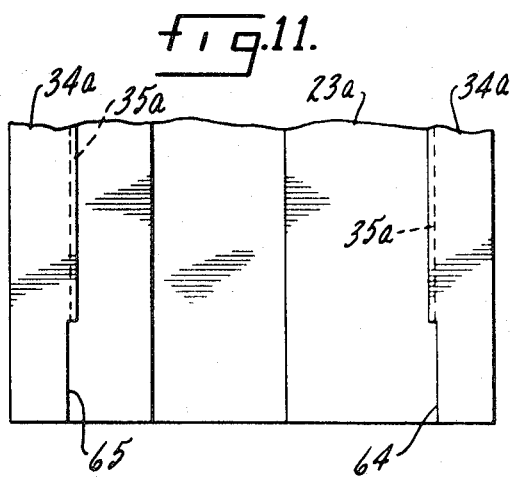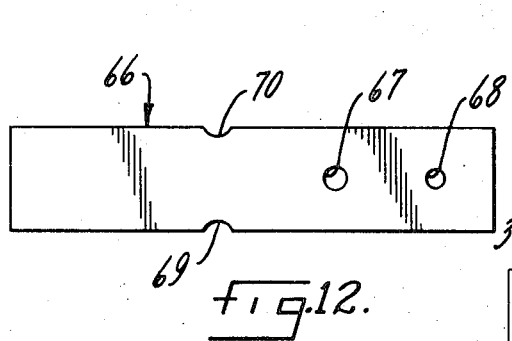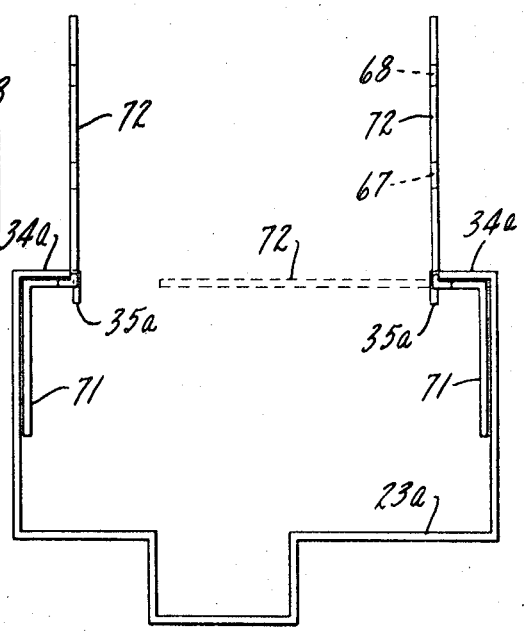

INVENTORS.
GALE K. CARLSON
BULOW A. PETERSON
BY Mann, Brown & McWilliams
Attorneys.

United States Patent Office 3,469,360
Patented Sept. 30, 1969

3,469,360
DOOR FRAMES
Bulow A. Peterson, Kewanee, and Gale K. Carlson, Princeton, Ill., assignors to Kewanee Manufacturing Company, a corporation of Illinois
Filed Aug. 4, 1967, Ser. No. 658,479
Int. Cl. E06b 1/18
U.S. Cl. 52—217          12 Claims

ABSTRACT OF THE DISCLOSURE

Quickly assembled door frames with improved corner joints between the head and jambs and improved connecting facilities for connecting the jambs to the wall structure to facilitate a flush appearance of the header and jambs and a tight and flush assembled door frame and wall.

---

The present invention is directed to new and useful improvements in door frames of the type which are especially formed for quick assembly.

Door frames of this class have been formed in a manner such that the stiles or jambs of the frame may be quickly applied so that the stiles or jambs and the header therefor may be quickly applied to a wall opening defining the door opening and quickly brought into a plumb relation through adjustment of the position of the stiles. An example of this type of frame is disclosed in Evans United States Patent 2,835,933. Frames of this general class are oftentimes applied over dry wall constructions. The appearance of frames of this general class is sometimes marred. For example, the walls over which the frames are fitted sometimes have uneven thicknesses and/or the wall studding may be twisted or distorted with the result that the stiles and header do not always fit together to present the flush corner appearance desired. The door jambs do not always hug the wall surfaces as snugly as is desired. In other cases the jambs do not always fit tightly against the wall, with the result that the strike jamb can be moved to prevent unintended unlocking of a locked door.

With the foregoing in mind, the present invention seeks to improve the fitting of such door frames and the appearance thereof by so forming door frames of this class that the frames easily accommodate walls of uneven thicknesses and twisted or distorted studding while providing essentially flush mating surfaces of the jambs and header, that the jambs and header provide a snug, close fitting relation between the frame and embraced wall surfaces, and that unintended dislodgment of portions of the frame near the strike jamb of the frame is minimized, all while improving the appearance of such door frames.

These and other purposes of the invention will become more apparent in the course of the specification and claims which follow when taken with the accompanying drawings, in which:

FIGURE 1 is a front elevation of a typical door frame embodying the principles of the present invention;

FIGURE 2 is a perspective view of a corner joint between the header and jambs of the door frame illustrated in FIGURE 1;

FIGURE 3 is an exploded view of the corner assembly illustrated in FIGURE 2;

FIGURE 4 is a top view of one element utilized in the corner joint illustrated in FIGURES 2 and 3;

FIGURE 5 is a side view of the element illustrated in FIGURE 4;

FIGURE 6 is an enlarged elevational view of the jambs illustrating a method of tying the jambs illustrated in FIGURE 1 to the wall structure;

FIGURE 7 is a side view of the jamb illustrated in FIGURE 6;

FIGURE 8 is a side view, with certain portions in section for purposes of clarity, of a compression lug and jamb which may be utilized in the frame of FIGURE 1;

FIGURE 9 is an exploded view of the compression lug elements illustrated in FIGURE 8;

FIGURE 10 is a side view of a modified form of compression lug and jamb assembly which may be utilized with the invention;

FIGURE 11 is a side view of a modified frame jamb which may be utilized with the invention;

FIGURE 12 is a side view of an element utilized with the jamb illustrated in FIGURE 11;

FIGURE 13 is a top view of the element illustrated in FIGURE 12 while illustrating a different position of the element;

FIGURE 14 is a top view of the jamb illustrated in FIGURE 11 while utilizing elements of the type illustrated in FIGURES 12 and 13;

FIGURE 15 is a side view of a jamb utilized in the frame of FIGURE 1 while illustrating certain attaching facilities illustrated in FIGURE 1 in detail;

FIGURE 16 is a view of the assembly illustrated in FIGURE 15 but looking in the direction of the arrows 16—16 of FIGURE 15;

FIGURE 17 is a plan view of a jamb utilized in the invention while illustrating a modified form of connecting facility between the jamb and wall structure;

FIGURE 18 is a side view of a certain element utilized in FIGURE 17;

Figure 19:
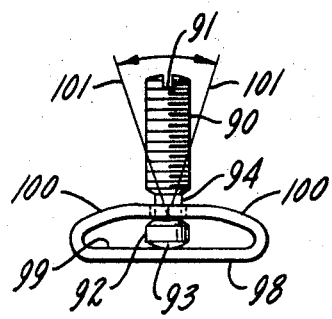
FIGURE 19 is an end view of a modified form of compression lug assembly.

With specific reference now to the drawings and, in the first instance to FIGURE 1, the numerals 20 and 21 generally designate vertical studding in the frame of a wall section, which studding is positioned on opposite sides of a door opening. A door frame for the opening is defined by vertically extending jambs 22 and 23 as well as a header 24. The jambs and header are preferably formed from high grade steel which may be on the order of 16 to 22 gauge. They may be formed from other material such as wood. The jambs and header have a channel like cross-section so that they fit over and embrace the wall structure around the door opening. The upper ends of the jambs are mitered as at 25 and 26 to cooperate with the mitered ends 27 and 28 of the header. Door frames of this general class, as is set forth in the aforementioned United States patent to Evans, are quickly assembled with the wall portions which define the door opening by first plumbing the wood frame or studding on the hinge side, as represented by the jamb 22, and then fitting the jamb 22 over the wall with the legs of the channel form of the jamb embracing the wall relatively firmly. The mitered end 27 of the header 24 is then positioned in sliding relation to the mitered end 25 of the jamb, after which the strike jamb 23 is positioned with its upper beveled or mitered surface 26 in sliding engagement with the mitered or beveled surface 28 of the header.

Compression elements, generally designated at 29 on both the hinge jamb 22 and the strike jamb 23 are then brought into engagement with the opposed wall surfaces. This forces the header 24 upwardly. Fasteners carried by a hinge jamb 22, and generally designated at 30, are then fixed to the wall. The strike jamb 23 is then checked to insure that the distance between the strike jamb and hinge jamb is the same at both the top of the opening and the bottom of the opening, after which an adjustment may be made if necessary in the strike jamb, and then fasteners, generally designated at 31, are used to fix the lower portion of the strike jamb to the wall. Fasteners 31 are usually identical to fasteners 30.

It should be understood that baseboards 32 and 33 overlie the fasteners 30 and 31 at the bottom of the hinge jamb and strike jamb after installation of the frame.

As is seen particularly in FIGURES 2 and 3, the channel-like form of the jambs and header is such as to provide flanges 34 at each end of the channel legs, which flanges extend inwardly toward one another and generally perpendicular to the general plane of the door opening. These flanges terminate in short legs 35 which extend perpendicular to the flange 34 and inwardly toward the door opening. The legs 35 are adapted to embrace the wall surfaces rather snugly. The upper ends of the jambs carry tabs or stop elements 36 which project inwardly toward the door opening and which are adapted for abutting engagement with ledge portions 37 formed on the header so that, when the header and jambs are assembled in loose fashion, the ledge portions 37 underlie the tabs 36. The tabs 36 and ledge portions 37 may be brought into snug engagement with one another during adjustment of the compression lugs 29 accompanied by relative movement of the header and jambs until a snug relation is obtained between the header and jambs.

The header carries wedge elements 38 on each of the channel-like legs thereof and at each end thereof. These wedge elements 38 are formed of plate stock and are spot welded or otherwise affixed to the legs of the header channel. These wedge elements are bent at the outer ends thereof, as appears in FIGURE 5, to form a somewhat hook-shape with one end 39 of the elements extending at an angle to the general plane of the remainder of the element. The angle may be on the order of 10–30°. The wedge elements 38 are formed from cold rolled steel of approximately 18 gauge and are so formed that the dimension represented at A in FIGURE 5 makes a wedging fit between the short leg portions 35 of the jambs and the main leg portions of the jambs. Thus, if the wall embraced by either the header or the jambs varies in thickness, either the header or jamb may slightly compress the wall or slightly expand the leg portions of either the header or jamb, as required, to insure a snug, flush, overlying relation between the mating ends of the header and jambs. Furthermore, the wedge elements tend to mask any crack or opening left between the beveled surfaces of the header and jambs in the event that these surfaces do not match perfectly. The crack or opening may be filled with putty.

If desired, screws 38a may be used to fix the wedge elements to the flanges 34 of the jambs after assembly of the jambs and header.

The invention includes improved means for fastening the lower ends of the vertical jambs 22 and 23 to the wall structure. As illustrated in FIGURES 6 and 7, each of the jambs 22 and 23 has generally vertically extending slots cut in the flange portions 34 thereof, as at 40. The slots are positioned so that their lower extremities are positioned above the lowermost portion of the jambs 22 and 23 and are positioned alongside of the short inwardly directed legs 35 of the jambs. The slots 40 are adapted to receive locking tabs 41 in the form of flat plates having a thickness generally matching the thickness of the slots 40. The plates or tabs 41 are formed so as to have an intermediate portion with a height designated at 42 equal to or slightly less than the height of the slots 40. The plate is also formed so as to provide shoulders 43 and 44 extending oppositely from the plate in the region of the intermediate portion 42 and offset with respect to one another so that the upper shoulder 43 may bear against the flange 34 of the jamb on the inside thereof while the shoulder 44 bears against the flange 34 on the outside thereof, as is seen in FIGURE 6. The plate further includes a bearing surface 45 which extends within the jamb so as to bear flush against the inner surface of the short leg 35 of the jamb. Suitable fastener holes 46 and 47 are formed in the plate exteriorly of the jamb so that the plate may be fixed to the wall structure. The lower portion of the bearing surface 45 may be beveled as at 48 to enable removal of the plates 41 and insertion thereof through swinging movement toward and away from the dotted line position illustrated in FIGURE 6.

The plates 41 are easily inserted into the full line position of FIGURE 6, and, when inserted, the shoulders 43 and 44 provide bearing surfaces against the flange 34 of the jambs. After insertion, and when the jambs are fitted over the wall structure, the plates are then secured to the wall structure by passing nails or other suitable fasteners through one or the other, or both, of the apertures 46 and 47. Since the plates 41 are essentially flat, the pressure applied by the fasteners transmits pressure through the surface 45 and against the inwardly directed short legs 35. This tends to force the legs tightly against the wall structure along the lines 49 and 50 (the wall embracing surfaces of the short legs 35), thus minimizing the extent of any crack which may otherwise appear along these lines. The plates in each of the slots may exert resilient pressure which forces the legs 35 into a snug embracing relation with the opposite sides of the wall structure.

The plates 41 are easily inserted in the jambs after the jambs have been positioned over the wall. After insertion, they are firmly locked in place against relative lateral movement and forward and backward movement with respect to the jamb.

The door frame includes improved compression lug facilities at the upper portion of one or both jambs. As is seen in FIGURES 8 and 9, the compression lug assembly, generally designated at 29, includes a pressure transmitting bolt 51 having a slotted head 52 which is seated in a matching circular opening in the stop portion of the jamb. Bolt 51 has a circular portion larger than the head 52 to form a shoulder 53, which is adapted to bear against the inner surface of the jamb stop portion carrying the bolt. A washer 54 has a countersunk opening 54a which matches the enlarged portion 53. Washer 54 is welded to the inner surface of the stop portion of the jamb as illustrated in FIGURE 8. The bolt is thus captivated by the washer and jamb and rotatably mounted in the washer and the stop portion of the jamb. Bolt 51 carries a compression lug 55 which is screw-threaded on the bolt so that rotation of the bolt in one direction or the other will force the lug inwardly or outwardly with relation to the adjacent wall surface. The compression lug 55 may have a number of different shapes and configurations. As shown, it has the form of a flat plate with a screw-threaded backup member 56 welded thereto.

When pressure is applied to the lug, as by means of rotating the bolt 51, pressure is transmitted through the bolt to the shoulder portion 53 thereof and against the jamb stop. As formed, the bolt cannot be lost in shipment because it is entirely captivated by the jamb stop. Furthermore, the particular configuration utilized provides a flush appearance of the bolt in the jamb stop and thus makes the bolt less conspicuous than it is in other constructions.

FIGURE 10 illustrates a modified form of compression lug assembly which is also arranged to approximate a flush condition of the screw head and jamb stop. In FIGURE 10, for example, a rivet 57 has a beveled head 58 which is received in a matching countersunk opening in the jamb stop. The rivet 57 is upset as at 59 so that the rivet is captivated in the jamb. The rivet is internally threaded as at 60 so as to receive a threaded bolt 61 having a compression exerting element 62 on the inner end thereof. The outer end of the bolt is slotted as at 63 so that a screw driver may be inserted into the opening in the rivet to turn the bolt 61 and apply pressure through the lug portion or element 62 to the wall structure 21. The reaction pressure is transmitted through the rivet to the material of the stop portion of the jamb.

FIGURES 11–14 illustrate modified fastening tabs for the lower ends of the jambs in such a way as to facilitate a flush close-fitting engagement between the inwardly directed leg portions of the jambs and the wall structures over which the jambs are fitted. For example, in these figures the jamb is illustrated at 23a and includes the characteristic inwardly directed flanges 34a along with the short legs 35a which extend toward the door opening in the same manner as in the jambs 22 and 23 of FIGURE 1. Recesses are cut in the lower portions of the flanges 34a and legs 35a as designated at 64 and 65. In forming these recesses, the entire inwardly directed leg portions 35a are cut away throughout the height of the recesses which, as illustrated, extend all the way to the extreme bottom of the jamb. These recesses or slots are cut so as to provide a recess having a thickness somewhat greater than the thickness of the inwardly directed leg portions 35a. For example, the width of the recesses may be .02 to .05 inch greater than the thickness of the material of the jambs. Securing tabs 66, as illustrated in FIGURES 12 and 13 are adapted to be fixed to the jambs and extend through the recesses 64 and 65. These tabs or plates 66 may be stamped from flat sheet stock on the order of 18 gauge cold rolled steel. The plates include spaced apertures 67 and 68 in one end portion thereof, and recesses 69 and 70 formed in the upper and lower edges of the plate at an intermediate portion of the plate. The length of the plate from the recesses to the extreme end opposite to the end of the plate carrying the apertures is greater than the width of the flanges 34a. The plates 66 are bent between the recesses 69 and 70 and the ends opposite to the aperture carrying ends of the plates, as shown in FIGURE 13, to provide end portions 71 extending at right angles to the remainder of the plate carrying the recesses of the plates 69 and 70 and the apertures 67 and 68. These end portions 71 are then spot welded or otherwise affixed to the inner surfaces of the main legs of the jamb as illustrated in FIGURE 14. The plates then extend as illustrated in dotted outline in FIGURE 14, and with the notches or recesses 69 and 70 in the plates overlapping the edges of the slots 64 and 65. When installing the jambs, the plates are then bent to the full line position of FIGURE 14 so as to provide offset and generally parallel end portions of the tab, as represented at 71 and 72 in FIGURE 14, and with the plates extending through the recesses 64 and 65. The notches 69 and 70 facilitate such bending of the plates. The thickness of the material of the plates is less than the width of the recesses so that, when the plates are bent snugly against the vertical side walls of the recesses, the plates may be positioned laterally outwardly of the vertical lines defining the inner portions of the short legs 35a which are adapted to embrace the wall. When the plates are then nailed or screwed to the wall structure, the resiliency of the plates tends to push the leg portions 35a inwardly toward one another so as snugly embrace the wall structure therebetween. This minimizes the presence of any crack between the wall structure and the jamb.

Door frames of the type herein disclosed are sometimes pried or otherwise bent near the lock region of the frame in an attempt to open a locked door. This has sometimes been attempted with frames of the type herein disclosed by exerting pressure on the jamb in the region of the lock and toward the wall structure. In order to prevent such tampering, the invention contemplates a positive fixing of the jamb carrying the door strike plate to prevent inward or outward movement, when subjected to such humanly applied pressure. In FIGURES 15 and 16, for example, the strike jamb 23 carries a threaded hollow rivet 75 of the precise type described in FIGURE 10. It is preferably positioned just above the strike plate 76, as is seen in FIGURE 16. Rivet 75 carries a lock screw of a special configuration therein. The lock screw, for example, has a slotted head 77 which is exposed through the opening in the rivet, and at the end of a first threaded portion 78, while the opposite end portion of the screw is of reduced diameter and is threaded and formed as a self-tapping screw 79. The pitch of the threads on the portions 78 and 79 are identical, and the number of threads per unit length are identical so that the advance of the threaded end portion 79 within the wood studding 21 of the wall per revolution of the screw is the same as the advance of the threaded portion 78 within the rivet 75.

Thus, as the screw is turned to move it inwardly into the position illustrated in FIGURE 15, the jamb stays in its prealigned position as the screw is rotated to bring it to the finally seated and locked position illustrated in FIGURE 14. Rotation of the screw cannot bow the jamb 23 outwardly away from the other jamb. If the screw portion 79 slips somewhat so that it does not advance as far as it could during the partial or full revolution, it tends to create a reaction on the jamb in a direction toward the other jamb; but this is not disadvantageous. The screw thus positively acts as a stop between the wall surface and the strike carrying jamb of the frame near the strike region to oppose any outward bowing of the strike jamb. When the door is closed, the door will overlie the slotted end portion of the screw, and thus mask it from tampering.

FIGURES 17 and 18 illustrate further modification of fastening assemblies for the lower portions of the jambs. in FIGURES 17 and 18, for example, jamb 23 carries two brackets 80 at the lower portions of the jamb. The opposite side surfaces or legs of the jambs are countersunk as at 81 to receive screws which are passed into the wall structure. Screws 82, as illustrated, are sometimes used in this fashion in lieu of the tabs illustrated at 30 and 31 in FIGURE 1 for purposes of fire resistant constructions. When the screws 82 are positioned as illustrated, the screw engages the wall structure within the enclosure of the metal jamb. In FIGURE 17 each of the brackets 80 is of plate stock and is bent to provide portions 83 and 84 extending at right angles to one another so that the portions 83 may be welded or otherwise affixed to the jambs as illustrated, while the portions 84 are generally aligned with the inwardly directed leg portions 35 of the jamb. The ends of the brackets opposite to the ends carrying the angular portions 83 are offset but parallel to the portions 84, as indicated at 85, so as to be flush against the leg portions 35. The brackets 80 have apertures 86 which are formed coaxial with the countersunk apertures 81 in the main leg portions of the jambs so as to receive the fastening screws 82 therethrough. The brackets 80, as so used, mask the area of the wall structure surrounding the area which receives the fastening screw, thus improving the fire resistant character of the wall structure at this area. Furthermore, the brackets 80 provide a bearing point for the screws 82 adjacent to the wall structure. This provides better holding contact with the wall structure than is the case where the brackets 84 are not employed, in which latter case the screws may tend to pivot about the countersunk apertures 81 and thus lose their normal holding power.

Figure 20:
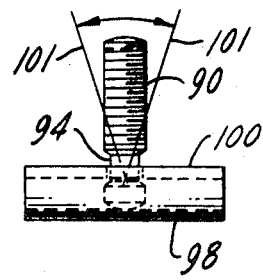
FIGURE 20 is a side view of the assembly illustrated in FIGURE 19.
Figure 21:
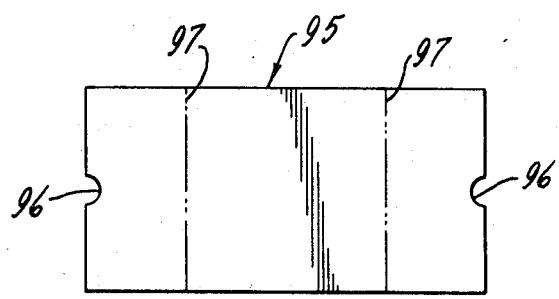
FIGURE 21 is a plan view of one element utilized in FIGURE 19 and 20.

FIGURES 19, 20 and 21 illustrate modifications which may be utilized in the compression lug assemblies for purposes of insuring a flush engagement between the compression lug and the wall studding which it bears against, even though the wall studding may be twisted or distorted, and thereby enhance engagement of the mitered surfaces of the header and jambs. It has been found that when wall studding is twisted or distorted, the compression lugs may engage the studding at only one side of the lug with the result that the mitered joints between the header and jambs will be tight on one side of the door frame while open on the other side. Also, the lugs may tend to slide along a badly twisted frame to some extent which increases the misalignment problem. In order to correct this type of problem, compression lug assemblies, as illustrated in FIGURES 19, 20 and 21, may be utilized. In these figures, for example, a screw 90 has a slotted end portion 91 for engagement by a screw driver or the like. Screw 90 is adapted to be carried in a rivet-like fitting in one or both jambs as illustrated in FIGURE 10. The opposite end of the screw carries a head 92 having a generally spherically formed or rounded end 93. A reduced neck portion 94 is between the head 92 and the threaded portion of the screw. The lug of the assembly is formed from flat plate stock 95 as indicated in FIGURE 21, with semicircular recesses 96 at the opposite side edges of the plate. The plate is then folded at spaced points, as along the lines 97, to provide a flat bearing portion 98, and with the recesses 96 loosely engaging the neck portion 94 of the screw. The head 92 of the screw is thus captivated between the surface 99 of the plate and the overlying folded portions 100.

The neck portion of the screw has a sufficient clearance with the recesses 96 so that it may be "cocked," canted, or swiveled, to and from positions wherein the longitudinal axis of the screw is approximately along the dotted lines 101, while the rounded head 93 remains in bearing engagement with the surface 99 of the lug. Thus, in the event studding is twisted or distorted, pressure applied to the lug by the screw will result in the flat surface 98 being flush with the surface of the stud. It has been found that the result is to enhance the formation of properly mating mitered joints of the jambs and header.

Compression lug facilities as illustrated in FIGURES 19, 20 and 21 may also be used in the region of the strike plate in lieu of the screws illustrated in FIGURES 15 and 16 to prevent outward bowing of the strike jamb.

Whereas we have shown and described an operative form of the invention, it should be understood that this showing and description thereof should be taken in an illustrative or diagrammatic sense only. There are modifications to the invention which will fall within the scope and spirit thereof and which will be apparent to those skilled in the art. The scope of the invention should be measured only by the scope of the hereinafter appended claims.

We claim:

1. In a quickly assembled door frame of the type having jambs and a header of channel form with mating beveled adjoining surfaces and with compression means carried by the upper portion of at least one of the jambs for an adjustable positioning of the frame relative to the wall structure utilized with the jambs, and wherein the channel form of the jambs provides spaced legs which terminate in U-shaped portions with cavities therein, the improvement comprising wedge plates carried by the header at opposite ends thereof and in overlapping and extended relation to the beveled surfaces at the ends of the header, said wedge plates each including outer portions of a wedging shape, said outer portions having a maximum dimension, measured transverse to the general plane of the frame, slightly greater than the width of said U-shaped portions of said jambs so as to form a wedging engagement therewith when said header and jambs are in assembled position thereby to cause relative movement of the opposite sides of the header and jamb in directions transverse to the general plane of the frame to an extent such as to provide vertical alignment of the beveled surface portions of the header and jambs.

2. The structure of claim 1 wherein said outer portions of each plate have a generally hook like form with the end of the hook like form being inclined with relation to the general plane of the wedge plate, said ends being spaced from the remainder of their associated plates by dimensions such that the hook like forms form a wedging engagement within said U-shaped portions.

3. A quickly assembled door frame assembly including a pair of jambs and a header for spanning and connecting said jambs, said jambs and header having a generally channel-like form to enable fitting thereof over the portions of a wall structure defining an opening, the legs of the channel form of said header and jambs being shaped to provide flanges directed toward one another at the extremities of the legs and leg portions of short extent formed at the inner portions of said flanges and extending toward the door opening sides of said jambs and headers, said header having wedge plates carried on each leg portion thereof at both ends thereof and formed and adapted for a wedging, seating engagement within the flanges and short legs of the jambs, the lower ends of said jambs having recesses formed therein, securing tabs extending within said recesses and having a bearing engagement with the material of said jambs, said tabs being positioned outwardly of the wall engaging surface portions of said short legs of said jambs whereby upon securing said tabs to a wall structure the tabs exert pressure on the lower leg portions of the jambs in directions toward one another, a compression lug assembly carried by at least one jamb at the upper end thereof, said lug assembly including an extensible pressure element formed and adapted to be extended into pressure engagement with an adjacent wall surface, and screw means carried by one of said jambs defining the strike jamb of the door frame at a location intermediate of the upper and lower portions of the jamb, said screw means being formed and adapted for engagement with a wall structure embraced by said strike jamb.

4. The structure of claim 3 wherein said tabs are in the form of plate-like elements fixed to the jambs, said plate-like elements having offset and generally parallel portions extending generally transversely to the length of the jambs, said recesses being formed through the short leg portions at the inner sides of the flanges, said plate-like elements having intermediate portions extending at right angles to said offset portions, and said intermediate portions having notches in the upper and lower edges thereof.

5. The structure of claim 3 wherein said securing tabs are in the form of plates removably inserted within recesses in the lower flange portions of said jambs, said plates being essentially flat and having a configuration providing upper and lower spaced shoulders extending away from one another and offset vertically from one another when said tabs are in assembled position with relation to said jambs, said offset shoulder portions being adapted for a bearing engagement with the inner and outer surface portions of the flanges adjacent to said recess.

6. The structure of claim 3 wherein said compression lug assembly is in the form of a bolt having a slotted head seated within a matching circular recess in the stop portion of at least one jamb, said bolt having an enlarged shoulder adjoining said slotted head and adapted to bear against the stop portion of said jamb, a washer fixed to said jamb and rotatably captivating said shoulder portion, said bolt having a threaded shank extending beyond said washer, and a compression element having a bearing surface for pressure engagement with a wall structure, said compression element being threadably mounted on said shank.

7. The structure of claim 3 wherein said compression element is in the form of a hollow threaded rivet fixed to the stop portion of each jamb, and a compression element having a threaded portion in threaded engagement with said rivet.

8. The structure of claim 3 wherein said screw means is in the form of a screw having a first threaded portion threadably received in a hollow rivet carried by said jamb and a second threaded portion adapted to be screwed into a wall structure, the pitch and lead of each threaded portion being identical whereby movement of said threaded portion within said rivet is accompanied by a corresponding movement of said other threaded portion within a frame structure without producing outward bowing forces on said jamb.

9. The structure of claim 3 wherein said securing tabs are in the form of brackets fixed to each jamb within the confines of each jamb, each bracket including a portion extending generally parallel to and aligned with said short leg portions, said brackets having apertures formed coaxially with apertures in the outer main leg portions of said jambs so as to receive fastening screws passed through the outer leg portions of the jambs and the brackets while providing bearing for such screws at the areas of the screws surrounded by said brackets.

10. The structure of claim 3 wherein said wedge plates have angularly formed end portions providing wedging surfaces inclined to the general plane of said wedge plates on the order of ten to thirty degrees and spaced from the main portions of said plates by dimensions such as to form a wedging engagement with said leg portions of short extent.

11. The structure of claim 3 wherein said compression lug assembly includes a screw threaded element and a pressure element loosely carried at one end of said screw for swiveling movement with respect to the axis of said screw.

12. The structure of claim 3 wherein said last named screw means includes a screw carried by one of said jambs defining the strike jamb and has a pressure exerting lug assembly swiveled on one end of said screw, said pressure exerting lug having a flat surface adapted to bear against wall studding.

References Cited
UNITED STATES PATENTS

| | | | |
|---|---|---|---|
| 2,025,161 | 12/1935 | Franklin | 52—204 |
| 2,835,933 | 5/1958 | Evans | 52—211 |
| 2,885,181 | 5/1959 | McCully et al. | 248—188.4 X |
| 3,216,539 | 11/1965 | Piget. | |
| 3,385,004 | 5/1968 | Oehler et al. | 52—214 |

FRANK L. ABBOTT, Primary Examiner

SAM D. BURKE III, Assistant Examiner

U.S. Cl. X.R.

52—665; 248—188.4